(12) United States Patent
Mullen et al.

(10) Patent No.: US 6,248,698 B1
(45) Date of Patent: Jun. 19, 2001

(54) SYNERGISTIC MINERAL BLENDS FOR CONTROL OF FILTRATION AND RHEOLOGY IN SILICATE DRILLING FLUIDS

(75) Inventors: Gregory A. Mullen; Allen Gabrysch, both of Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/439,551

(22) Filed: Nov. 12, 1999

(51) Int. Cl.⁷ .................................................. C09K 7/02
(52) U.S. Cl. ................ 507/140; 507/141; 507/145; 507/139
(58) Field of Search .................................. 507/141, 145, 507/139, 140

(56) References Cited

U.S. PATENT DOCUMENTS

| | | | |
|---|---|---|---|
| 3,640,343 | * 2/1972 | Darley | 507/145 |
| 3,658,701 | 4/1972 | McGlothlin et al. | 252/8.5 P |
| 3,679,001 | * 7/1972 | Hill | 507/141 |
| 3,746,109 | * 7/1973 | Darley | 507/145 |
| 4,519,922 | 5/1985 | Sutton et al. | 252/8.5 B |
| 4,584,327 | 4/1986 | Sutton et al. | 523/130 |
| 5,007,480 | 4/1991 | Andersen | 166/292 |
| 5,307,877 | * 5/1994 | Cowan et al. | 507/140 |
| 5,337,824 | * 8/1994 | Cowan | 507/140 |
| 5,363,918 | 11/1994 | Cowan et al. | 166/295 |
| 5,501,277 | 3/1996 | Onan et al. | 166/293 |
| 5,518,996 | * 5/1996 | Maroy et al. | 507/140 |

* cited by examiner

*Primary Examiner*—Philip Tucker
(74) *Attorney, Agent, or Firm*—Paula D. Morris & Associates, P.C.

(57) ABSTRACT

A silicate drilling fluid having effective rheology and filtration control properties comprising water as a continuous phase wherein hematite is used as a weighting agent and manganese oxide is used as a bridging agent. The drilling fluids uses a minimal number of components, which includes a salt, preferably sodium chloride, water-soluble polymers for viscosification and filtration control, and a glycol for shale stabilization and filtration control.

21 Claims, No Drawings

SYNERGISTIC MINERAL BLENDS FOR CONTROL OF FILTRATION AND RHEOLOGY IN SILICATE DRILLING FLUIDS

FIELD OF THE INVENTION

The invention relates to a relatively high density silicate drilling mud with improved rheology and filtration control properties. More particularly, the invention relates to silicate drilling fluids comprising hematite as a weighting agent and manganese oxide as a bridging agent and which have excellent rheological and filtration control properties.

BACKGROUND OF THE INVENTION

The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these functions are accomplished by circulating a fluid down through the drill string and up to the surface between the drill string and the wall of the borehole. Generally, the borehole into which the casing or liner is introduced is filled with drilling mud.

Most drilling muds have either an aqueous or an oil base. Water base drilling fluids are not only popular, but often are necessary in order to meet applicable environmental regulations. The current generation of water-based drilling fluids often contains a high concentration of additives to improve borehole stability, improve lubricity, and to control seepage loss to the formation. A high concentration of additives, such as glycols, silicates, or surfactant-lubricant blends, makes it difficult to formulate some higher density fluids (esp. silicate fluids) to balance desired Theological properties with adequate shale stabilization and filtration control.

Silicate drilling fluids are capable of giving superior borehole stability. The soluble silicate in a silicate drilling fluid is believed to invade the shale matrix and either (a) the soluble silicates precipitate when they contact the $Ca^{2+}$ and $Mg^{2+}$ available in the reservoir fluid, or (b) the reduced pH encountered in the reservoir fluid causes polymerization to occur. Both mechanisms are capable of effectively plugging the pore throats of the shale and reducing filtrate invasion.

A principal requirement of any good drilling fluid, including a silicate drilling fluid, is that the fluid remain pumpable while suspending a sufficient amount of weighting additives to meet the desired density requirements, particularly with respect to preventing gasification and blow-outs. One commonly used weighting agent is barite. Unfortunately, the use of high concentrations of barite in silicate drilling fluids results in significant depletion of silicate during exposure to heat. Silicate depletion may diminish borehole stability using silicate drilling fluids.

Alternative formulations are needed in which the silicates are not depleted during exposure to heat, and which have desirable rheology, shale stabilization, and filtration control properties.

SUMMARY OF THE INVENTION

The present invention provides a silicate drilling fluid having effective rheology and filtration control properties. The silicate drilling fluid comprises water as a continuous phase, hematite as a weighting agent, and manganese oxide as a bridging agent.

DETAILED DESCRIPTION OF THE INVENTION

The present invention is based on the premise that calcium is responsible for silicate depletion from silicate drilling fluids. Calcium carbonate generally is insoluble under the conditions present during the use of most drilling fluids. In contrast, silicate drilling fluids have a relatively high pH. The high pH coupled with elevated temperatures is believed to cause reactions between calcium carbonate and sodium silicate. These reactions are believed to be responsible for the depletion of the silicates from silicate drilling fluids, and to cause an increase in fluid loss which negatively impacts borehole stability.

The present invention avoids silicate depletion by replacing barite with hematite as a weighting agent and replacing calcium carbonate with manganese oxide as a bridging agent. The result is a relatively high density (10.5 to 16 ppg), high performance water based silicate mud with adequate rheology and with adequate shale stabilizaton and filtration control properties.

The silicate drilling fluid of the present invention may be used to drill most sections of a typical well in the Gulf of Mexico (GOM). The performance parameters of major importance are: low rheology, including plastic viscosity (PV), yield point (YP), and gel strengths; minimal rheology variation between initial and heat aged properties; minimal fluid loss; and reduced silicate depletion after heat aging. In a preferred embodiment, a 16 ppg fluid has the following properties:

| Plastic Viscosity | Yield Point | Gels | API | 24 hr., HTHP |
|---|---|---|---|---|
| 30–40, cP | 20–30, lb/100 ft$^2$ | 12/20, lb/100 ft$^2$ | <10 ml | <40 ml |

For a 10.5 ppg fluid, performance parameters preferably are:

| Plastic Viscosity | Yield Point | Gels | API | 24 hr., HTHP |
|---|---|---|---|---|
| 18–20, cP | 10–15, lb/100 ft$^2$ | 6/10, lb/100 ft$^2$ | <4 ml | <40 ml |

In addition, initial and post heat age rheology should have minimal change and silicate depletion should be minimal.

The silicate drilling fluid preferably contains water as a continuous phase, a water-soluble viscosifying polymer, a water-soluble filtration control polymer, a glycol for filtration control and shale stabilization, a silicate, a hematite weighting agent, a manganese oxide bridging agent, salt, and a base to control pH, a preferred base being sodium hydroxide.

The silicate drilling fluid contains any suitable salt, preferably one or more monovalent salts, including but are not necessarily limited to those based on metals such as sodium, potassium, cesium, and lithium. The salt contains substantially any anions, with preferred anions including, but not necessarily limited to chlorides, bromides, formates, propionates, sulfates, acetates, carbonates, and nitrates. A preferred anion is chloride. Preferred drilling fluids comprise about 0% w/w to about 26% w/w, preferably about 20% w/w of the salt, with a preferred salt being NaCl.

The drilling fluid contains "water-soluble polymers," defined as polymers that are capable of viscosifying a drilling fluid and/or providing filtration control for a drilling fluid. Suitable water-soluble polymers are non-toxic and include, but are not necessarily limited to water-soluble starches and derivatized versions thereof, water soluble gums and derivatized versions thereof, and water-soluble celluloses. Starches that are suitable for use in the present invention include, but are not necessarily limited to corn based and potato based starches, preferred starches being more temperature stable starches. Gums that are suitable for use in the present invention include, but are not necessarily limited to xanthan gums, wellan gums, scleroglucan gums, and guar gums. These polymers are widely available from commercial sources.

As used herein, the terms "derivatized starches" and "derivatized gums" refer to starches and gums that have been derivatized in a manner that renders them inherently non-fermentable in order to avoid the need for a preservative. Water-soluble "derivatized starches" and "derivatized gums" that should operate successfully include, but are not necessarily limited to: hydroxyalkyl starches and gums; starch and gum esters; cross-link starches and gums; hypochlorite oxidized starches and gums; starch and gum phosphate monoesters; starch and gum xanthates; and, dialdehyde starches and gums. These derivatized starches and gums can be manufactured using known means, such as those set forth in detail in Chapter X of *Starch: Chemistry and Technology* 311–388 (Roy L. Whistler, et al. eds., 1984), incorporated herein by reference.

Specific examples of suitable derivatized starches and gums that fall within the foregoing categories include, but are not necessarily limited to: carboxymethyl starches and gums; hydroxyethyl starches and gums; hydroxypropyl starches and gums; hydroxybutyl starches and gums; carboxymethylhydroxyethyl starches and gums; carboxymethylhydroxypropyl starches and gums; carboxymethylhydroxybutyl starches and gums; polyacrylamide starches and gums; and, other starch and gum copolymers.

Preferred viscosifying polymers for use in the system include, but are not necessarily limited to polysaccharride viscosifying polymers, such as XAN-PLEX™, XAN-PLEX D™, XANVIS™, all of which are available from Baker Hughes INTEQ. A most preferred viscosifying polymer is XAN-PLEX™, available from Baker Hughes INTEQ. The fluid preferably comprises from about 0.25 ppb to about 2 ppb, preferably about 0.25 ppb of the viscosifying polymer.

Another type of water soluble polymer used in the system is a filtration control polymer. Preferred filtration control polymers are BIO-PAQ™, BIOLOSE™, and combinations thereof. Most preferred filtration control polymers are modified polysaccharides, most preferably BIO-PAQ™. BIO-PAQ™ and BIOLOSE™ are commercially available from Baker Hughes INTEQ. The fluid preferably contains from about 2 to about 10, preferably about 8 ppb of the filtration control polymer.

The drilling system also contains from about 1 to about 25% v/v, preferably from about 3 to about 10% v/v of a glycol or a polyether glycol. Suitable glycols include, but are not necessarily limited to propylene glycols, ethylene glycols, glycol ethers, and EO/PO glycols. Commercially available glycols for such use include, but are not necessarily limited to AQUA-COL™-B, AQUA-COL™-D, and AQUA-COL™-S, available from Baker Hughes INTEQ. A preferred glycol is AQUA-COL™ S, a polyether polyol liquid.

The drilling fluid contains hematite, or iron oxide, as a weighting agent. Hematite, or iron oxide, may have several empirical formulations, depending upon the ore, and the number of iron atoms and oxygen atoms in the ore. Common forms include, but are not necessarily limited to FeO, $Fe_2O_3$, and combinations thereof As used herein, the terms "hematite" and "iron oxide" are intended to cover all of forms of iron oxide suitable for use as a weighting agent in the drilling fluids of the invention. The drilling fluid preferably contains from about 25 to about 400 ppb, preferably from about 200 to about 300 ppb hematite. A preferred hematite is DENSIMIX, an iron oxide product available from Baker Hughes INTEQ. Although DENSIMIX is primarily hematite, it does contain some impurities, including silica, or crystalline quartz. DENSIMIX has the following physical properties:

Boiling Point: 5432° F.

Melting Point 2797° F.

Physical Properties: Pure solid

Solubility in Water: Insoluble

Appearance: Red-Black, metallic

Specific Gravity: 5.15

The drilling fluid contains a manganese oxide as a bridging agent. Manganese oxide can take a variety of forms, depending on the number of manganese atoms and the number of oxygen atoms. Common forms include, but are not necessarily limited to manganous oxide (MnO), manganic oxide ($Mn_2O_3$), manganese tetraoxide ($Mn_3O_4$), and combinations thereof. As used herein the term "manganese oxide" is intended to cover all of the forms of manganese oxide suitable for use as a bridging agent in the drilling fluids of the invention. The drilling fluid preferably contains from about 20 to about 200 ppb, preferably from about 75 to about 120 ppb manganese oxide. In a preferred embodiment, the drilling fluid contains MICROMAX, available from Baker Hughes INTEQ, preferably at about 116 ppb. MICROMAX is a reddish-brown powder primarily comprising $Mn_3O_4$, and has the following properties:

| Major Elements | Typical Values | Minor Elements | Typical values |
| --- | --- | --- | --- |
| Mn | 69.00% | P | 0.04% |
| Fe | 2.00% | Na | <0.1% |
|  |  | Co | 0.02% |

| Major Elements | Typical Values | Minor Elements | Typical values |
|---|---|---|---|
| | | Cu | 0.02% |
| | | S | 0.006% |
| | | Pb | 0.075% |
| | | Zn | 0.12% |
| | | Si | 0.09% |
| | | Ti | 0.002% |
| | | Ni | 0.009% |
| | | Ca | 0.006% |
| | | K | <0.01% |
| | | Mg | 0.30% |
| | | Al | 0.012% |
| | | B | 0.003% |

Physical Data:

Average particle size: $0.4\mu$

Surface area: $2.4\ m^2/g$

Bulk density: $950-1050\ kg./m^3$

Specific gravity: 4.8

Absolute volume: 0.0250 gals./lb.

Specifications:

Specific gravity: 4.75–4.95

Mn content: 67–70%

Fe content: max 4.5%

CaO content: max 0.4%

Surface area: $2-4\ m^2/g$

A preferred ratio of DENSIMIX to MICROMAX is from about 15:1 to about 1:1, preferably from about 3:5 to about 2:1.

Any suitable silicate may be used in the drilling fluid. Suitable silicates include, but are not necessarily limited to inorganic acid salts, such as sodium silicate, potassium silicate, lithium silicate, and combinations thereof. Preferred silicates have a ratio of $SiO_2$ to $Na_2O$ of from about 3.5:1 to about 1.8:1. A preferred silicate is silicate D, a sodium silicate available from PQ Corporation. The sodium silicate preferably is from about 5 to about 30% v/v, preferably about 9% v/v of the fluid.

The drilling fluid preferably does not contain calcium carbonate because calcium carbonate appears to react with sodium silicate, causing uncontrollable fluid loss and silicate depletion.

A most preferred embodiment of the silicate drilling system of the present invention comprises water, NaCl, NaOH, XAN-PLEX™ D, BIO-PAQ™, Silicate D, AQUA-COL™ S, and approximately a 3.5:1 to a 2:1 ratio of DENSIMIX® to MICROMAX. A preferred formulation has the following composition:

The invention will be more clearly understood with reference to the following examples, which are illustrative only and should not be construed as limiting the present invention.

EXAMPLE 1

Based on the results of initial screening tests, the following formulations were tested with the following results:

| Fluid Formulation | A | B | C | D |
|---|---|---|---|---|
| Water, bbl | 0.6 | 0.6 | 0.62 | 0.62 |
| NaCl, lb/bbl | 53 | 53 | 54 | 53 |
| NaOH, lb/bbl | 0.4 | 2 | 2 | 2 |
| XAN-PLEX ™ D, lb/bbl | 0.25 | 0.25 | 0.25 | 0.25 |
| BIO-PAQ ™, lb/bbl | 8 | 8 | 8 | 8 |
| Silicate D, bbl | 0.09 | 0.09 | 0.09 | 0.09 |
| AQUA-COL ™ S, bbl | 0.05 | 0.05 | 0.05 | 0.05 |
| DENSIMIX ®, lb/bbl | 234 | 234 | 259 | 278 |
| MICROMAX, lb/bbl | 116 | 116 | 78 | 78 |

The fluids were hot rolled at 180° F. for 16 hours. The following were the results:

| Fann 35 A Rheology at 120° F. | A | | B | | C | | D | |
|---|---|---|---|---|---|---|---|---|
| | Initial | Aged | Initial | Aged | Initial | Aged | Initial | Aged |
| 600 rpm | 118 | 88 | 97 | 85 | 94 | 92 | 90 | 88 |
| 300 rpm | 88 | 58 | 64 | 55 | 62 | 58 | 60 | 55 |
| 200 rpm | 76 | 48 | 52 | 43 | 51 | 46 | 48 | 44 |
| 100 rpm | 64 | 35 | 39 | 32 | 39 | 33 | 35 | 30 |
| 6 rpm | 45 | 18 | 15 | 13 | 19 | 12 | 16 | 10 |
| 3 rpm | 35 | 16 | 17 | 12 | 17 | 10 | 15 | 9 |
| PV, lb/100 ft$^2$ | 30 | 30 | 33 | 30 | 32 | 34 | 30 | 33 |
| YP, lb/100 ft$^2$ | 58 | 28 | 31 | 25 | 30 | 24 | 30 | 22 |
| 10 sec gel, lb/100 ft$^2$ | 34 | 17 | 19 | 15 | 18 | 12 | | 11 |
| 10 min gel lb/100 ft$^2$ | 41 | 22 | 33 | 22 | 28 | 19 | | 16 |
| pH | 11.9 | 11.6 | 12.2 | 12.1 | 12.2 | 11.5 | | 12.5 |
| HTHP fluid loss* | | 38 | | 29 | | 34 | | 35 |

*180° F., cm$^3$/24 hr, 5 micron disc.

All of the formulations, which contained from a 2:1 to a 3.5:1 ratio of hematite to manganese oxide, had adequate rheology and filtration control properties.

| Water (bbl) | NaOH (ppb) | XAN-PLEX (ppb) | NaCl (ppb) | BIO-PAQ (ppb) | Silicate D (% v/v) | DENSI-MIX (ppb) | MICRO-MAX (ppb) | AQUA-COL S (% v/v) |
|---|---|---|---|---|---|---|---|---|
| 0.6 | 2 | 0.25 | 53–54 | 8 | 9 | 234–278 | 78–116 | 5 |

EXAMPLE 2

For comparative purposes, the following silicate fluids were tested using barite or hematite as a weighting agent without manganese oxide, and fluids were tested containing either MnO from Prince Manufacturing or MICROMAX, without hematite or barite:

| Fluid Formulation | E | F | G | H |
|---|---|---|---|---|
| Water, bbl | 0.6 | 0.6 | 0.62 | 0.62 |
| NaCl, lb/bbl | 53 | 53 | 54 | 53 |
| NaOH, lb/bbl | 0.2 | 2 | 2 | 2 |
| XAN-PLEX ™ D, lb/bbl | 0.25 | 0.25 | 0.25 | 0.25 |
| BIO-PAQ ™, lb/bbl | 8 | 8 | 8 | 8 |
| Silicate D, bbl | 0.09 | 0.09 | 0.09 | 0.09 |
| AQUA-COL ™ S, bbl | 0.05 | 0.05 | 0.05 | 0.03 |
| Barite, lb/bbl | 356 | | | |
| Hematite, lb/bbl | | 335 | | |
| MnO (Prince), lb/bbl | | | 347 | |
| MICROMAX, lb/bbl | | | | 333 |

The fluids were hot rolled at 180° F. for 16 hours. The following were the results:

| Fann 35 A Rheology at 120° F. | E Initial | E Aged | F Initial | F Aged | G Initial | G Aged | H Initial | H Aged |
|---|---|---|---|---|---|---|---|---|
| 600 rpm | 169 | 160 | 119 | 116 | 218 | 184 | 185 | 128 |
| 300 rpm | 112 | 105 | 82 | 78 | 139 | 116 | 140 | 85 |
| 200 rpm | 90 | 84 | 68 | 64 | 107 | 88 | 120 | 70 |
| 100 rpm | 65 | 60 | 52 | 48 | 69 | 56 | 105 | 53 |
| 6 rpm | 34 | 26 | 29 | 22 | 14 | 9 | 92 | 32 |
| 3 rpm | 30 | 23 | 25 | 19 | 10 | 6 | 90 | 31 |
| PV, lb/100 ft$^2$ | 57 | 55 | 37 | 38 | 79 | 68 | 45 | 43 |
| YP, lb/100 ft$^2$ | 55 | 50 | 45 | 40 | 60 | 48 | 95 | 42 |
| 10 sec gel, lb/100 ft$^2$ | 29 | 19 | 20 | 16 | 9 | 6 | | 34 |
| 10 min gel, lb/100 ft$^2$ | 44 | 27 | 30 | 21 | 13 | 11 | | 39 |
| pH | | 12.6 | | 11.7 | | | | 11.7 |
| HTHP fluid loss* | | 39 | | 52 | | 29 | | 24 |

*180° F., cm$^3$/24 hr, 5 micron disc.

None of the fluids exhibited both adequate rheology and adequate filtration control properties.

EXAMPLE 3

For comparative purposes, the following silicate fluids were tested using barite or DENSIMIX as a weighting agent with and without calcium carbonate:

| Fluid Formulation | I | J | K | L |
|---|---|---|---|---|
| Water, bbl | 0.6 | 0.6 | 0.62 | 0.62 |
| NaCl, lb/bbl | 53 | 53 | 54 | 53 |
| NaOH, lb/bbl | 0.2 | 2 | 2 | 2 |
| XAN-PLEX ™ D, lb/bbl | 0.25 | 0.25 | 0.25 | 0.25 |
| BIO-PAQ ™, lb/bbl | 8 | 8 | 8 | 8 |
| Silicate D, bbl | 0.09 | 0.09 | 0.09 | 0.09 |
| AQUA-COL ™ S, bbl | 0.05 | 0.05 | 0.05 | 0.03 |
| Barite, lb/bbl | 356 | 351 | | |
| DENSIMIX, lb/bbl | | | 333 | 325 |
| calcium carbonate, lb/bbl | | 20 | | 20 |

The fluids were hot rolled at 180° F. for 16 hours, and the filtrate was analyzed for silicate depletion by measuring the content of Na$_2$O and SiO$_2$. The following were the results:

| Fluid Formulation | I Initial | I Aged | J Initial | J Aged | K Initial | K Aged | L Initial | L Aged |
|---|---|---|---|---|---|---|---|---|
| Na$_2$O, mg/L | 23300 | 20600 | 22800 | 14600 | 19800 | 19800 | 14900 | 16100 |
| SiO$_2$, mg/L | 48000 | 36000 | 45000 | 22500 | 37500 | 37500 | 25500 | 19500 |

*180° F., cm$^3$/24 hr, 5 micron disc.

The presence of calcium carbonate resulted in much higher silicate depletion fluids I and J, which contained calcium carbonate.

EXAMPLE 4

For comparative purposes, the following silicate fluids were tested using Prince Mfg. MnO or MICROMAX as a weighting agent with and without calcium carbonate:

| Fluid Formulation | M | N | O | P |
|---|---|---|---|---|
| Water, bbl | 0.6 | 0.6 | 0.62 | 0.62 |
| NaCl, lb/bbl | 53 | 53 | 54 | 53 |
| NaOH, lb/bbl | 0.2 | 2 | 2 | 2 |
| XAN-PLEX ™ D, lb/bbl | 0.25 | 0.25 | 0.25 | 0.25 |
| BIO-PAQ ™, lb/bbl | 8 | 8 | 8 | 8 |
| Silicate D, bbl | 0.09 | 0.09 | 0.09 | 0.09 |
| AQUA-COL ™ S, bbl | 0.05 | 0.05 | 0.05 | 0.03 |
| MnO, lb/bbl | 333 | 325 | | |
| MICROMAX, lb/bbl | | | 333 | 325 |
| calcium carbonate, lb/bbl | | 20 | | 20 |

The fluids were hot rolled at 180° F. for 16 hours, and the filtrate was analyzed for silicate depletion by measuring the content of $Na_2O$ and $SiO_2$. The following were the results:

| Fluid Formulation | I | | J | | K | | L | |
|---|---|---|---|---|---|---|---|---|
| | Initial | Aged | Initial | Aged | Initial | Aged | Initial | Aged |
| $Na_2O$, mg/L | 23600 | 19800 | 22300 | 14900 | 22900 | 20800 | 22300 | 15500 |
| $SiO_2$, mg/L | 42000 | 34500 | 42000 | 22500 | 33000 | 34500 | 40500 | 19500 |

*180° F., $cm^3$/24 hr, 5 micron disc.

The presence of calcium carbonate resulted in much higher silicate depletion in fluids M and N, which contained calcium carbonate.

EXAMPLE 4

For comparative purposes, the following silicate fluids were tested using a 2:1 ratio of DENSIMIX:MICROMAX with and without calcium carbonate:

| Fluid Formulation | Q | R |
|---|---|---|
| Water, bbl | 0.6 | 0.6 |
| NaCl, lb/bbl | 53 | 53 |
| NaOH, lb/bbl | 0.2 | 2 |
| XAN-PLEX ™ D, lb/bbl | 0.25 | 0.25 |
| BIO-PAQ ™, lb/bbl | 8 | 8 |
| Silicate D, bbl | 0.09 | 0.09 |
| AQUA-COL ™ S, bbl | 0.05 | 0.05 |
| DENSIMIX, lb/bbl | 234 | 234 |
| MICROMAX, lb/bbl | 116 | 116 |
| calcium carbonate, lb/bbl | | 20 |

The fluids were hot rolled at 180° F. for 16 hours, and the filtrate was analyzed for silicate depletion by measuring the content of $Na_2O$ and SiO2. The following were the results:

| Fluid Formulation | Q | | R | |
|---|---|---|---|---|
| | Initial | Aged | Initial | Aged |
| $Na_2O$, mg/L | 26000 | 22300 | 20500 | 16400 |
| $SiO_2$, mg/L | 40500 | 40500 | 40500 | |

*180° F., $cm^3$/24 hr, 5 micron disc.

The presence of calcium carbonate resulted in much higher silicate depletion in fluid R, which contained calcium carbonate.

Many modifications may be made to the present invention without departing from the spirit and scope of the present invention. The embodiment described herein is meant to be illustrative only and should not be taken as limiting the invention, which is defined in the following claims.

We claim:

1. A silicate drilling fluid having effective rheology and filtration control properties comprising:
    water as a continuous phase;
    hematite as a weighting agent; and,
    manganese oxide as a bridging agent.

2. The fluid of claim 1 wherein said hematite is present at a ratio to said manganese oxide of from about 15:1 to about 1:1.

3. The fluid of claim 1 wherein said hematite is present at a ratio to said manganese oxide of from about 3.5:1 to about 2:1.

4. A silicate drilling fluid having effective rheology and filtration control properties comprising:
    water as a continuous phase;
    a weighting agent consisting essentially of a quantity of hematite; and
    a bridging agent consisting essentially of an amount of manganese oxide;
    said quantity of hematite being at a ratio to said amount of manganese oxide of from about 15:1 to about 1:1.

5. The fluid of claim 4 wherein said hematite is present at a ratio to said manganese oxide of from about 3.5:1 to about 2.5:1.

6. The drilling fluid of claim 1 further comprising a quantity of one or more water-soluble polymers effective to provide said fluid with adequate rheology and filtration control properties.

7. The drilling fluid of claim 2 further comprising a quantity of one or more water-soluble polymers effective to provide said fluid with adequate rheology and filtration control properties.

8. The drilling fluid of claim 3 further comprising a quantity of one or more water-soluble polymers effective to provide said fluid with adequate rheology and filtration control properties.

9. The drilling fluid of claim 4 further comprising a quantity of one or more water-soluble polymers effective to provide said fluid with adequate rheology and filtration control properties.

10. The drilling fluid of claim 5 further comprising a quantity of one or more water-soluble polymers effective to provide said fluid with adequate rheology and filtration control properties.

11. The drilling fluid of claim 1 further comprising a quantity of a glycol effective to provide said fluid with shale stabilization properties.

12. The drilling fluid of claim 2 further comprising a quantity of a glycol effective to provide said fluid with shale stabilization properties.

13. The drilling fluid of claim 3 further comprising a quantity of a glycol effective to provide said fluid with shale stabilization properties.

14. The drilling fluid of claim 4 further comprising a quantity of a glycol effective to provide said fluid with shale stabilization properties.

15. The drilling fluid of claim 5 further comprising a quantity of a glycol effective to provide said fluid with shale stabilization properties.

16. The drilling fluid of claim 10 further comprising a quantity of a glycol effective to provide said fluid with shale stabilization properties.

17. A silicate drilling fluid having effective rheology and fluid loss control properties, said silicate drilling fluid consisting essentially of:
   water as a continuous phase;
   one or more monovalent salt;
   a silicate in an amount effective to provide borehole stabilization;
   a weighting agent comprising hematite in a quantity effective to produce a desired density;
   a bridging agent comprising manganese oxide, said hematite being present at a ratio to said manganese oxide of about 15:1 to about 1:1;
   one or more water-soluble polymers in an amount effective to provide viscosity and filtration control; and,
   a glycol in an amount effective to provide shale stabilization.

18. The silicate drilling fluid of claim 17 wherein
   said salt is monovalent;
   said hematite is present at a ratio to said manganese oxide of from about 3.5:1 to about2:1.

19. A method for reducing silicate depletion in a silicate drilling fluid comprising using a combination consisting essentially of manganese oxide as a bridging agent and hematite as a weighting agent.

20. The method of claim 19 wherein said hematite is at a ratio to said manganese oxide of from about 15:1 to about to 1:1.

21. The method of claim 19 wherein said hematite is at a ratio to said manganese oxide of from about 3.5:1 to about to 2:1.

* * * * *